UNITED STATES PATENT OFFICE.

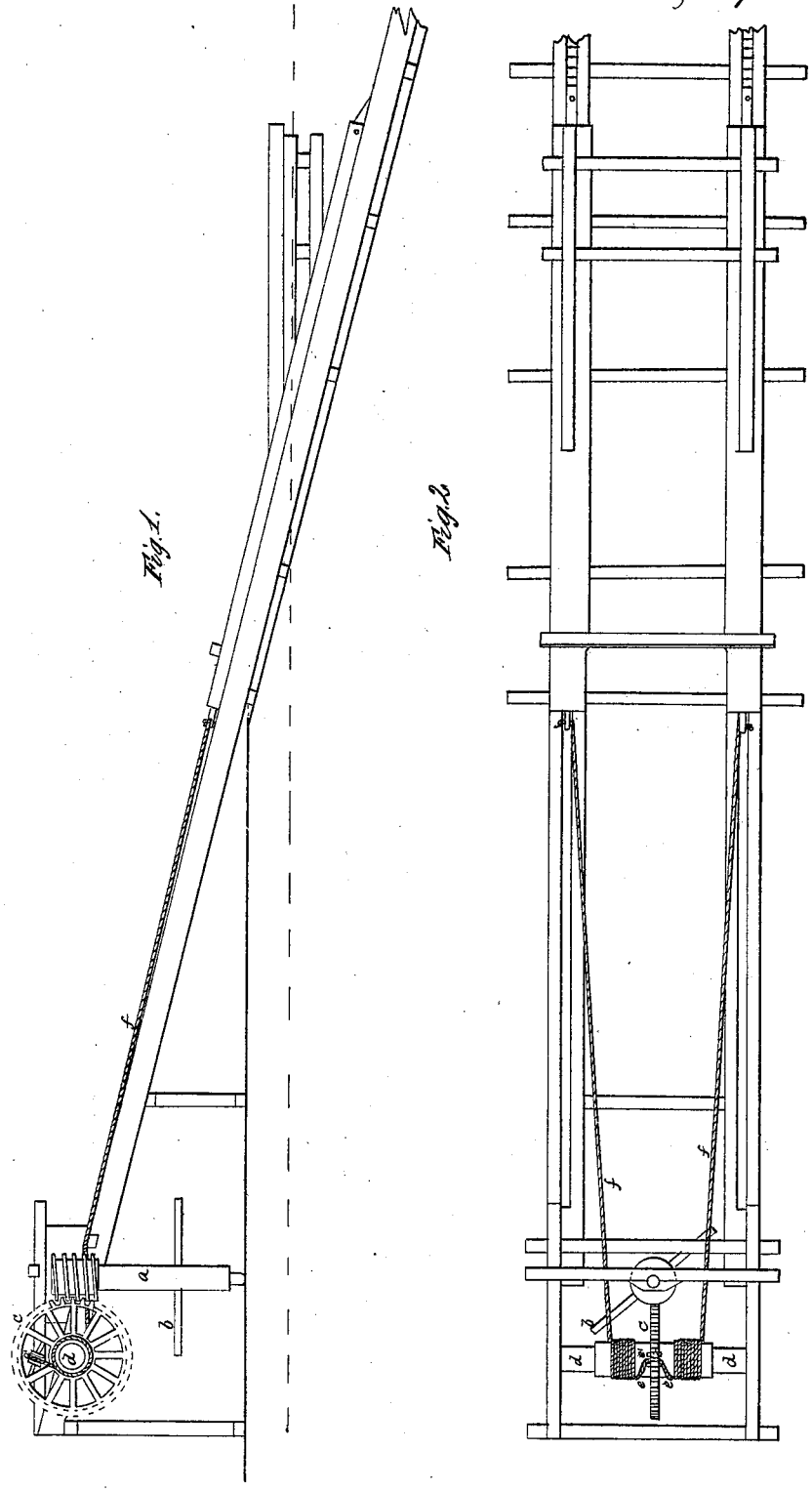

ELIJAH MURRAY, OF PADUCAH, KENTUCKY.

WINDLASS.

Specification of Letters Patent No. 5,494, dated March 28, 1848.

*To all whom it may concern:*

Be it known that I, E. MURRAY, of Paducah, in the State of Kentucky, have invented new and useful Improvements in Windlasses for Drawing Vessels Out of Water on Inclined Planes, and for other Purposes, and that the following is a full, clear, and exact description of the principle or character which distinguishes them from all other things before known and of the manner of making, constructing, and using the same, reference being had to the accompanying drawings, making part of this specification, in which—

Figure 1 is a side elevation of my apparatus, and Fig. 2, a top plan.

The same letters indicate like parts in all the figures.

The nature of my improvement consists in the method of adjusting the tension of the chains or cords used in drawing up heavy bodies and equalizing the same, by which an equal motion is produced without too much on any one point.

The apparatus is constructed as follows: If a horsepower is to be used I employ an upright shaft ($a$) having an ordinary sweep ($b$) projecting horizontally therefrom. A worm wheel or endless screw is constructed on the shaft ($a$) near the upper end which works into a large spur wheel ($c$) on the center of a long horizontal shaft ($d$) on which two sleeves or windlasses are put, one on each side of the wheel ($c$). These windlasses turn loosely on the shaft and around them the chain is wound that draws up the vessel. To turn these sleeves a short chain ($e$) is attached to them, one end to each, this chain passes over a pulley ($e'$) placed in the large spur wheel and with its bearings in the spokes thereof; this pulley is carried around with the wheel and drags around the sleeves with it, thus winding on the chains ($f$) that are connected with the cradles on which the vessel rests. The connecting chain as will be observed yields either way as an extra strain is brought upon one or the other sleeve. It is obvious that the short connecting chain ($e$) may be a continuation of the two main chains which are connected together around the pulley ($e'$) for that purpose without changing the result.

What I claim as my invention and desire to secure by Letters Patent is—

Constructing a double chain windlass, substantially as above described, the two parts of said windlass being so connected as to equalize the strain in the manner set forth.

ELIJAH MURRAY.

Witnesses:
J. M. MILLIKEN,
G. MAGNOR.